(12) United States Patent
Komulainen et al.

(10) Patent No.: US 7,734,269 B2
(45) Date of Patent: Jun. 8, 2010

(54) CONTROL OF RECEIVER ANTENNA DIVERSITY

(75) Inventors: Petri Komulainen, Oulu (FI); Risto Timisjärvi, Jääli (FI)

(73) Assignee: Nokia Corporation, Espoo (FI)

( * ) Notice: Subject to any disclaimer, the term of this patent is extended or adjusted under 35 U.S.C. 154(b) by 826 days.

(21) Appl. No.: 11/580,129

(22) Filed: Oct. 13, 2006

(65) Prior Publication Data
US 2008/0057995 A1    Mar. 6, 2008

(30) Foreign Application Priority Data
Sep. 1, 2006    (FI) .................................. 20065545

(51) Int. Cl.
*H04B 7/04* (2006.01)
(52) U.S. Cl. .................. 455/277.2; 455/522; 455/140
(58) Field of Classification Search .................. None
See application file for complete search history.

(56) References Cited

U.S. PATENT DOCUMENTS

| | | | |
|---|---|---|---|
| 6,006,096 A | * | 12/1999 | Trompower ............. 455/522 X |
| 7,024,168 B1 | * | 4/2006 | Gustafsson et al. ... 455/277.1 X |
| 2004/0242277 A1 | | 12/2004 | Kiribayashi |
| 2005/0191978 A1 | | 9/2005 | Spencer et al. |
| 2005/0191982 A1 | | 9/2005 | Rudberg |
| 2005/0201482 A1 | | 9/2005 | Iwasaki et al. |

OTHER PUBLICATIONS

Murch, Ross et al, "*Antenna System for Broadband Wireless Access*", IEEE Communications Magazine, Apr. 2002, pp. 76-83.
International search report PCT/FI2007/050468 filed Aug. 31, 2007.

* cited by examiner

*Primary Examiner*—Philip J Sobutka
(74) *Attorney, Agent, or Firm*—Squire, Sanders & Dempsey L.L.P.

(57) ABSTRACT

Control of receiver antenna diversity is described in relation to apparatuses, user radio terminals, a method, and a computer program. The apparatus comprises an interface configured to obtain information on a power control procedure of a radio receiver and a processing unit configured to switch on/off a receiver antenna diversity branch of the radio receiver on the basis of a comparison between a predetermined condition and the information on the power control procedure.

6 Claims, 1 Drawing Sheet

CONTROL OF RECEIVER ANTENNA DIVERSITY

FIELD

The invention relates to apparatuses, user radio terminals, a method, and a computer program.

BACKGROUND

A receiver antenna diversity technique may be utilized in a radio receiver to enhance performance. As multiple samples of a radio signal are obtained using receiver antenna diversity and combined, the desired signal is amplified. In addition, receiver antenna diversity improves network capacity and service coverage.

However, radio receivers utilizing receiver antenna diversity are more complex than single-antenna receivers. This increases power consumption. Especially in a user radio terminal provided with a battery or other similar independent energy source the increased power consumption may shorten operation time.

SUMMARY OF THE INVENTION

The present invention seeks to provide improved apparatuses, user radio terminals, a method, and a computer program.

According to an aspect of the present invention, there is provided an apparatus comprising: an interface configured to obtain information on a power control procedure of a radio receiver; and a processing unit configured to switch on or off a receiver antenna diversity branch of the radio receiver on the basis of a comparison between a predetermined condition and the information on the power control procedure.

According to another aspect of the present invention, there is provided a user radio terminal comprising: an interface configured to obtain information on a power control procedure of a radio receiver; and a processing unit configured to switch on or off a receiver antenna diversity branch of the radio receiver on the basis of a comparison between a predetermined condition and the information on the power control procedure.

According to another aspect of the present invention, there is provided a method comprising: obtaining information on a power control procedure of a radio receiver; and switching on or off a receiver antenna diversity branch of the radio receiver on the basis of a comparison between a predetermined condition and the information on the power control procedure.

According to another aspect of the present invention, there is provided a computer program comprising: obtaining information on a power control procedure of a radio receiver; and switching on or off a receiver antenna diversity branch of the radio receiver on the basis of a comparison between a predetermined condition and the information on the power control procedure.

According to another aspect of the present invention, there is provided another apparatus comprising: interface means for obtaining information on a power control procedure of a radio receiver; and processing means for switching on or off a receiver antenna diversity branch of the radio receiver on the basis of a comparison between a predetermined condition and the information on the power control procedure.

According to another aspect of the present invention, there is provided another user radio terminal comprising: interface means for obtaining information on a power control procedure of a radio receiver; and processing means for switching on or off a receiver antenna diversity branch of the radio receiver on the basis of a comparison between a predetermined condition and the information on the power control procedure.

BRIEF DESCRIPTION OF THE DRAWINGS

Embodiments of the present invention are described below, by way of example only, with reference to the accompanying drawings, in which.

DETAILED DESCRIPTION OF PREFERRED EMBODIMENTS

Figure 1:
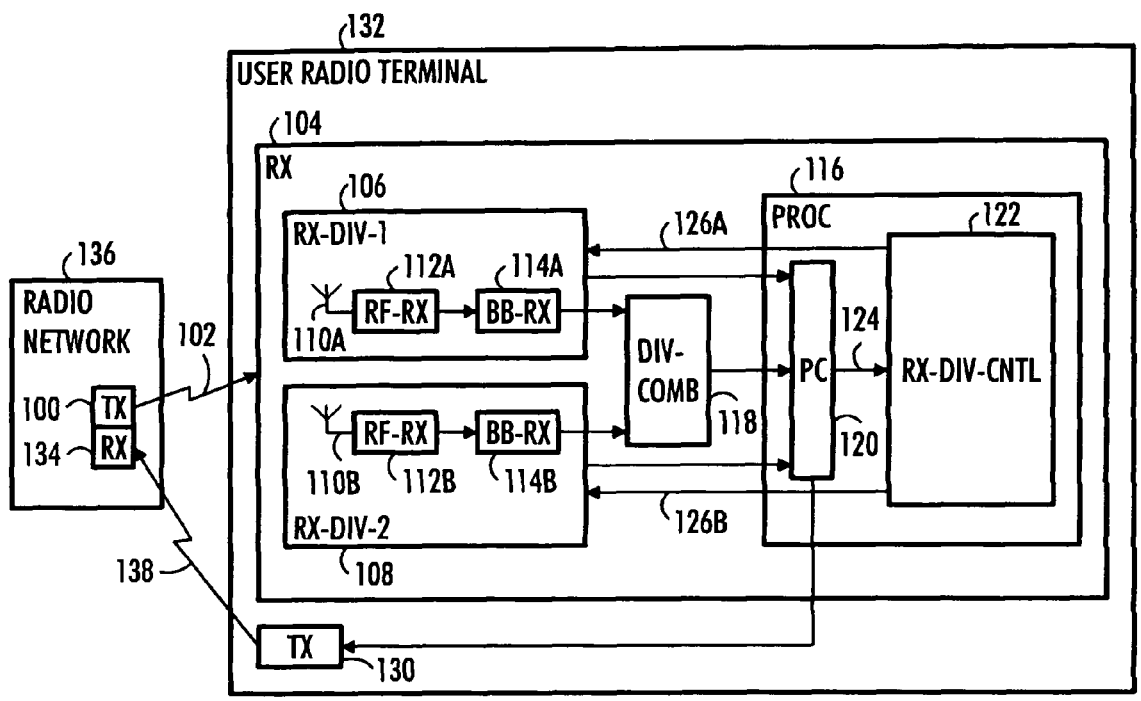
FIG. 1 illustrates embodiments of a radio receiver.

With reference to FIG. 1, let us examine embodiments of a radio receiver 104. The radio receiver 104 utilizes the receiver antenna diversity technique, in which a radio signal 102 is received using multiple receiver antennas 110A, 110B. A transmitter 100 transmitting the radio signal 102 may utilize multiple transmitting antennas, but it is not necessary. A diversity combining unit 118 combines the signals from different receiver antennas 110A, 110B to produce a signal of improved quality. The basic receiver antenna diversity technique is also known as space diversity, in which multiple versions of the transmitted radio signal propagated on different paths are received. Also other diversity techniques may be utilized, such as polarization diversity, time diversity and frequency diversity, but they are not necessary. The radio receiver 104 may be utilized in a number of different systems, for example in a CDMA (Code Division Multiple Access) or WCDMA (Wideband CDMA) system, or in some other system applying a power control procedure. The reception quality depends heavily on the receiver structure. Thus, with better receivers lower transmission powers may be used, which in turn improves network capacity. In fact, receiver antenna diversity receivers increase the network capacity in power-controlled systems.

The radio receiver 104 comprises more than one receiver antenna diversity branch 106, 108, each one of which may comprise, in addition to the receiver antenna 110A, 110B, radio-frequency receiver parts 112A, 112B and baseband receiver parts 114A, 114B. The radio frequency receiver parts 112A, 112B may comprise radio-frequency filters and down-converters. There may also be analogue-to-digital converters, as the radio-frequency receiver parts 112A, 112B may process the received radio signal in an analogue format, and the baseband receiver parts 114A, 114B in a digital format. The radio-frequency receiver parts 112A, 112B and the baseband receiver parts 114A, 114B may be implemented as hardware, i.e. as one or more integrated circuits, such as application-specific integrated circuits ASIC, or as a circuit built of separate logic components. A hybrid of these different implementations is also feasible. The diversity combining unit 118 may be implemented in a similar fashion, i.e. as hardware.

The radio receiver 104 also comprises a power control unit 120 responsible for the power control of the radio signal 102. The term power control refers to a technique where transmission power of a channel in the transmitter 100 is adjusted adaptively and constantly so that the transmitted channel does not swamp other channels in the radio signal 102 or radio signals of other transmitters. The aim of power control is to reduce interference and hence better utilize scarce radio resources. Power control also necessitates the use of a feedback channel. In the example of FIG. 1, a transmitter 130 coupled to the receiver 104 implements the feedback channel 138. The transmitter 100 transmitting the radio signal 102 is also coupled to a receiver 134. Although transmitters and receivers are depicted as separate units in FIG. 1, a transmitter/receiver pair may also be combined into a transceiver unit, the receiver 104 and the transmitter 130 forming one transceiver, for example.

Next, examples of power control in UMTS (Universal Mobile Telecommunications System) are presented.

Open loop power control is the ability of the user equipment (UE) transmitter to set its output power to a specific value. It is used for setting initial uplink and downlink transmission powers when a UE is accessing the network. The open loop power control tolerance is ±9 dB (normal conditions) or ±12 dB (extreme conditions).

Inner loop power control (also called fast closed loop power control) in the uplink is the ability of the UE transmitter to adjust its output power in accordance with one or more Transmit Power Control commands (TPC_cmd) received in the downlink in order to keep the received uplink Signal-to-Interference Ratio (SIR) at a given SIR target. The UE transmitter is capable of changing the output power by a step size of 1, 2 and 3 dB in a slot immediately after the TPC_cmd. Inner loop power control frequency is 1500 Hz.

The serving cells estimate SIR of the received uplink DPCH (Dedicated Physical Channel), generate TPC commands (TPC_cmd) and transmit one command per slot according to the following rule: if $SIR_{est} > SIR_{target}$ then the TPC command to transmit is "0", while if $SIR_{est} < SIR_{target}$ then the TPC command to transmit is "1". Upon reception of one or more TPC commands in a slot, the UE derives a single TPC command for each slot, combining multiple TPC commands if more than one is received per slot. The UE supports two algorithms for deriving a TPC_cmd. Which of these two algorithms is used, is determined by a UE-specific higher-layer parameter, "PowerControlAlgorithm".

Algorithm 1:

The power control step is the change in the UE transmitter output power in response to a single TPC command.

Algorithm 2:

If all five estimated TPC commands are "down", the transmit power is reduced by 1 dB;

If all five estimated TPC commands are "up", the transmit power is increased by 1 dB;

Otherwise the transmit power is not changed.

TABLE

Transmitter power control range

| | Transmitter power control range | | | | | |
|---|---|---|---|---|---|---|
| | 1 dB step size | | 2 dB step size | | 3 dB step size | |
| TPC_cmd | Lower | Upper | Lower | Upper | Lower | Upper |
| +1 | +0.5 dB | +1.5 dB | +1 dB | +3 dB | +1.5 dB | +4.5 dB |
| 0 | −0.5 dB | +0.5 dB | −0.5 dB | +0.5 dB | −0.5 dB | +0.5 dB |
| −1 | −0.5 dB | −1.5 dB | −1 dB | −3 dB | −1.5 dB | −4.5 dB |

The transmit power of the downlink channels is determined by the network. The power control step size can take four values: 0.5, 1, 1.5 or 2 dB. It is mandatory for UTRAN (UMTS Terrestrial Radio Access Network) to support a step size of 1 dB, while support of other step sizes is optional. The UE generates TPC commands to control the network transmit power and sends them in the TPC field of the uplink DPCCH (Dedicated Physical Control Channel). Upon receiving the TPC commands UTRAN adjusts its downlink DPCCH/DPDCH (Dedicated Physical Data Channel) power accordingly.

Outer loop power control is used to maintain the quality of communication at the level of the bearer service quality requirement, while using as low power as possible. The uplink outer loop power control is responsible for setting a target SIR in the Node B for each individual uplink inner loop power control. This target SIR is updated for each UE according to the estimated uplink quality (Block Error Ratio BLER, Bit Error Ratio BER) for each Radio Resource Control connection. The downlink outer loop power control is the ability of the UE receiver to converge to required link quality (BLER) set by the network in downlink.

Power control of the downlink common channels is determined by the network. In general the ratio of the transmit power between different downlink channels is not specified in 3GPP specifications and may change with time, even dynamically. Additional special situations of power control are power control in compressed mode and downlink power control during handover. Further details on power control may be found in 3GPP (3rd Generation Partnership Project) technical specifications 25.101, 25.133, 25.214, 25.215, 25.331, 25.433, 25.435, 25.841, 25.849.

The power control unit 120 may be implemented in a similar fashion as the diversity combining unit 118, i.e. as hardware. Another way to implement the power control unit 120 is with a processing unit 116 and suitable software. The processing unit 116 may refer to a processor (such as a digital signal processor or a microprocessor), which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The processor may also have an operating system, which may provide system services to a computer program written with the program instructions. An embodiment provides a computer program comprising program instructions for causing a processor to perform a method described later in detail with reference to FIG. 2.

The computer program may be in a source code form, object code form, or in some intermediate form, and it may be stored in some sort of a carrier, which may be any entity or device capable of carrying the program. Such carriers include a record medium, a computer memory, and a read-only memory, for example. Depending on the processing power needed, the computer program may be executed in a single processor or it may be distributed amongst a number of processors.

It should be noted that the diversity combining unit 118 and the baseband receiver parts 114A, 114B may also be implemented with the processing unit 116 and suitable software, provided that there is enough processing power.

The radio receiver 104 also comprises an interface 124 configured to obtain information on the power control procedure of the radio receiver 104. As illustrated in FIG. 1, this interface 124 may derive its information from the power control unit 120. The interface 124 may be implemented with suitable interface technologies, such as a message interface, a method interface, a sub-routine call interface, a block interface, or any means enabling communication between functional sub-units. If the processing unit 116 is implemented as an ASIC or as some other pure hardware implementation, the interface 124 may also utilize hardware, such as wiring, coupling the power control unit 120 to a receiver antenna diversity control unit 122. If extreme integration is desired, the baseband receiver parts 114A, 114B, the diversity combining unit 118, the processing unit 116, the power control unit 120, and the receiver antenna diversity control unit 122 may be implemented as blocks of an ASIC or ASICs.

The processing unit 116 is configured 122 to switch 126A, 126B on/off the receiver antenna diversity branch 106/108 of the radio receiver 104 on the basis of a comparison between a predetermined condition and the information on the power control procedure. The idea is that a receiver antenna branch, in the example either 106 or 108, may be switched off when the information on the power control procedure indicates that the quality of reception is good enough, or switched on when the information on the power control procedure indicates that the quality of reception is not good enough. In the example of FIG. 1, both receiver antenna branches 106, 108 are diversity branches, i.e. either of the branches may be turned on or off. Another feasible embodiment is one where one of the receiver antenna branches, for example 106, is always on, and only the other branch, for example 108, is the diversity branch that may be turned on or off.

The goal of the power control is to maintain a certain quality target (for example block error rate BLER) while minimizing transmission power. Minimizing the transmission power then minimizes the interference caused to other users and channels in the network. This in turn aims at maximizing the capacity of the network. The power control has a limited dynamic range, i.e. there is a maximum and a minimum level for the transmission power. Thus, in good conditions the transmission power settles to the minimum level and can no longer be decreased even though the signal in the receiver exceeds the required quality target. In power-controlled systems, the conditions for many user radio terminals are so good (for example they are close to the base station) that their dedicated downlink signal settles to the (channel-specific) minimum level of base station transmission power, or very close to it. In such conditions, there is no gain for the radio network or the user radio terminal from applying receiver antenna diversity. Thus, the receiver antenna diversity should be switched off, and switched on again only when the conditions are getting worse (for example when moving away from the base station).

In the example of FIG. 1, the radio receiver 104 is in a user radio terminal 132 and a transmitter 100 of a radio network 136 transmits the radio signal 102. The radio network 136 may contain a network element called a base station, base transceiver station, node B, radio access point, etc., which includes the radio transmitter 100 (and the receiver 134). In such a situation, the switching off of one receiver antenna diversity branch 106/108 reduces the power consumption of the user radio terminal 132, i.e. the operation time of the battery of the user radio terminal 132 is lengthened. Regardless of the whereabouts of the radio receiver 104, the capacity and coverage of the radio network 136 are kept optimal with the described adaptive use of the receiver antenna diversity.

The interface 124 may be further configured 122 to obtain the information on the power control procedure in the form of power control commands. The power control commands are kind of condensed information on the quality of reception. With reference to the UMTS power control discussion above, the interface 124 may be further configured to obtain such information on the power control procedure in connection with an inner loop, or fast closed loop, power control procedure. TPC commands perfectly describe the receiver 104 structure/performance and the radio network 136 load.

The processing unit 116 may be further configured 122 to process the comparison in relation to "power up" and "power down" parameters of the power control commands. A "power up" parameter in general indicates that the reception quality is not so good, i.e. a receiver antenna diversity branch 106/108 should perhaps be turned on, or if it is already on, it should not be turned off. Similarly, a "power down" parameter may indicate that a receiver antenna diversity branch 106/108 could be turned off, or if it is already off, it should not be turned on.

The processing unit 116 may be further configured 122 to switch on the receiver antenna diversity branch 106/108 when a predetermined number of power control commands include the "power up" parameter, and off when a predetermined number of power control commands include the "power down" parameter. The predetermined number of power control commands may be defined in a number of ways; some examples include the following: a predetermined number of consecutive power control commands must include the same power control parameter, a set of consecutive power control commands must include at least a certain percentage of the same power control parameter, etc.

The processing unit 116 may be further configured to form an average value from the power control commands and to switch on the receiver antenna diversity branch 106/108 when the average value is greater than a predetermined threshold, and off when the average value is smaller than another predetermined threshold. The consecutive TPC commands (0 indicating "power down" and 1 indicating "power up") may be low-pass filtered with a discrete filter in order to obtain an appropriate long-term averaged measurement. Also other ways to obtain the average value may be used.

Besides power control commands, the power control information may include other information relating to the power control procedure. The interface 124 may be further configured to obtain a quality target for the power control procedure and the processing unit 116 may be further configured 122 to process the comparison in the form of a comparison between the quality target and the information on the power control procedure. Referring to the discussion of UMTS power control, the interface 124 may be further configured to obtain such information on the power control procedure in connection with an outer loop power control procedure. The processing unit 116 may be further configured 122 to process the information on the power control procedure in the form of a signal-to-interference ratio of a radio signal received with the radio receiver and the quality target in the form of a target for the signal-to-interference ratio. By comparing long-term SIR measurements and the SIR target provided by the outer loop power control algorithm, it may also be detected whether the radio network 136 is able to reduce its transmission power as much as requested, or whether the downlink transmission power has saturated to the minimum level of the dynamic range of the power control.

Figure 2:
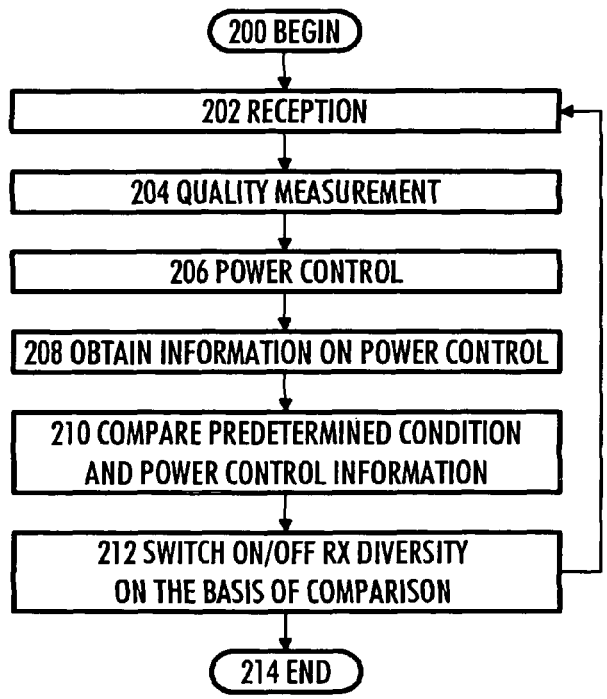
FIG. 2 illustrates embodiments of a method.

Next, embodiments of a method will be described with reference to FIG. 2. The method relates to control of receiver antenna diversity. In some cases, the method may be used for decreasing power consumption in a radio receiver. The method starts in 200. In 202, a radio receiver receives a radio signal. In 204, a quality measurement of the received radio signal is performed. On the basis of the quality measurement, a power control procedure is carried out in 206. In 208, information is obtained on the power control procedure 206 of the radio receiver. In 210, a comparison between a predetermined condition and the information on the power control procedure 206 is performed. In 212 a receiver antenna diversity branch of the radio receiver is switched on/off on the basis of the comparison 210. The control of the receiver antenna diversity branch is an adaptive ongoing procedure, i.e. operations 202-204-206-208-210-212 may be continued for as long as the radio receiver is receiving radio signals, and the method ends in 214 as the reception ends.

The formerly described details of the radio receiver 104 may be applied to the method as well. At least some of these details will be described next.

In 208, the information on the power control procedure may be obtained in the form of power control commands.

In 210, the comparison may be processed in relation to "power up" and "power down" parameters of the power control commands.

In 208, a quality target for the power control procedure may be obtained, and in 210 the comparison may be processed in the form of a comparison between the quality target and the information on the power control procedure.

In 210, the information on the power control procedure may be processed in the form of a signal-to-interference ratio of a radio signal received with the radio receiver and the quality target in the form of a target for the signal-to-interference ratio.

In 212, the receiver antenna diversity branch may be switched on when a predetermined number of power control commands include the "power up" parameter, and off when a predetermined number of power control commands include the "power down" parameter.

An average value may be formed from the power control commands and in 212 the receiver antenna diversity branch may be switched on when the average value is greater than a predetermined threshold, and off when the average value is smaller than another predetermined threshold.

In 208, the information on the power control procedure may be obtained at least in two ways: in connection with an inner loop, or fast closed loop, power control procedure and/or in connection with an outer loop power control procedure.

Even though the invention has been described above with reference to an example according to the accompanying drawings, it is clear that the invention is not restricted thereto but it can be modified in several ways within the scope of the appended claims.

The invention claimed is:

1. An apparatus, comprising:
a processor; and
a memory including computer program code,
the memory and the computer program code configured to, with the processor, cause the apparatus at least to
obtain power level change information of a power control procedure of a radio receiver, and
switch on or off a receiver antenna diversity branch of the radio receiver on the basis of a comparison between a predetermined condition and the power level change information of the power control procedure,
wherein the memory and the computer program code are further configured to, with the processor, cause the apparatus at least to obtain the information on the power control procedure in the form of power control commands,
wherein the memory and the computer program code are further configured to, with the processor, cause the apparatus at least to process the comparison in relation to "power up" and "power down" parameters of the power control commands, and
wherein the memory and the computer program code are further configured to, with the processor, cause the apparatus at least to switch the receiver antenna diversity branch on when a predetermined number of power control commands include the "power up" parameter, and to switch the receiver antenna diversity branch off when a predetermined number of power control commands include the "power down" parameter.

2. An apparatus, comprising:
a processor; and
a memory including computer program code,
the memory and the computer program code configured to, with the processor, cause the apparatus at least to
obtain power level change information of a power control procedure of a radio receiver, and
switch on or off a receiver antenna diversity branch of the radio receiver on the basis of a comparison between a predetermined condition and the power level change information of the power control procedure,
wherein the memory and the computer program code are further configured to, with the processor, cause the apparatus at least to obtain the information on the power control procedure in the form of power control commands, and
wherein the memory and the computer program code are further configured to, with the processor, cause the apparatus at least to form an average value from the power control commands and to switch on the receiver antenna diversity branch when the average value is greater than a predetermined threshold, and to switch off the receiver antenna diversity branch when the average value is smaller than another predetermined threshold.

3. A method comprising:
obtaining power level change information of a power control procedure of a radio receiver;
switching on or off a receiver antenna diversity branch of the radio receiver on the basis of a comparison between a predetermined condition and the power level change information of the power control procedure;
obtaining the information on the power control procedure in the form of power control commands;
processing the comparison in relation to "power up" and "power down" parameters of the power control commands; and
switching the receiver antenna diversity branch on when a predetermined number of power control commands include the "power up" parameter, and switching the receiver antenna diversity branch off when a predetermined number of power control commands include the "power down" parameter.

4. A method comprising:
obtaining power level change information of a power control procedure of a radio receiver;
switching on or off a receiver antenna diversity branch of the radio receiver on the basis of a comparison between a predetermined condition and the power level change information of the power control procedure;
obtaining the information on the power control procedure in the form of power control commands; and
forming an average value from the power control commands and switching the receiver antenna diversity branch on when the average value is greater than a predetermined threshold, and switching the receiver antenna diversity branch off when the average value is smaller than another predetermined threshold.

5. An apparatus comprising:
interface means for obtaining power level change information of a power control procedure of a radio receiver; and processing means for switching on or off a receiver antenna diversity branch of the radio receiver on the basis of a comparison between a predetermined condition and the power level change information of the power control procedure, wherein the interface means obtains the information on the power control procedure in the form of power control commands, wherein the processing means processes the comparison in relation to "power up" and "power down" parameters of the power control commands, and wherein the processing means switches the receiver antenna diversity branch on when a predetermined number of power control commands include the "power up" parameter, and switches the receiver antenna diversity branch off when a predetermined number of power control commands include the "power down" parameter.

6. An apparatus comprising:

interface means for obtaining power level change information of a power control procedure of a radio receiver; and processing means for switching on or off a receiver antenna diversity branch of the radio receiver on the basis of a comparison between a predetermined condition and the power level change information of the power control procedure, wherein the interface means obtains the information on the power control procedure in the form of power control commands, and wherein the processing means forms an average value from the power control commands and switches the receiver antenna diversity branch on when the average value is greater than a predetermined threshold, and switches the receiver antenna diversity branch off when the average value is smaller than another predetermined threshold.

* * * * *